July 5, 1927.
T. J. MELL
1,634,955
METHOD OF MAKING PATTERNED RUBBER SHEETING
Filed Nov. 24, 1924
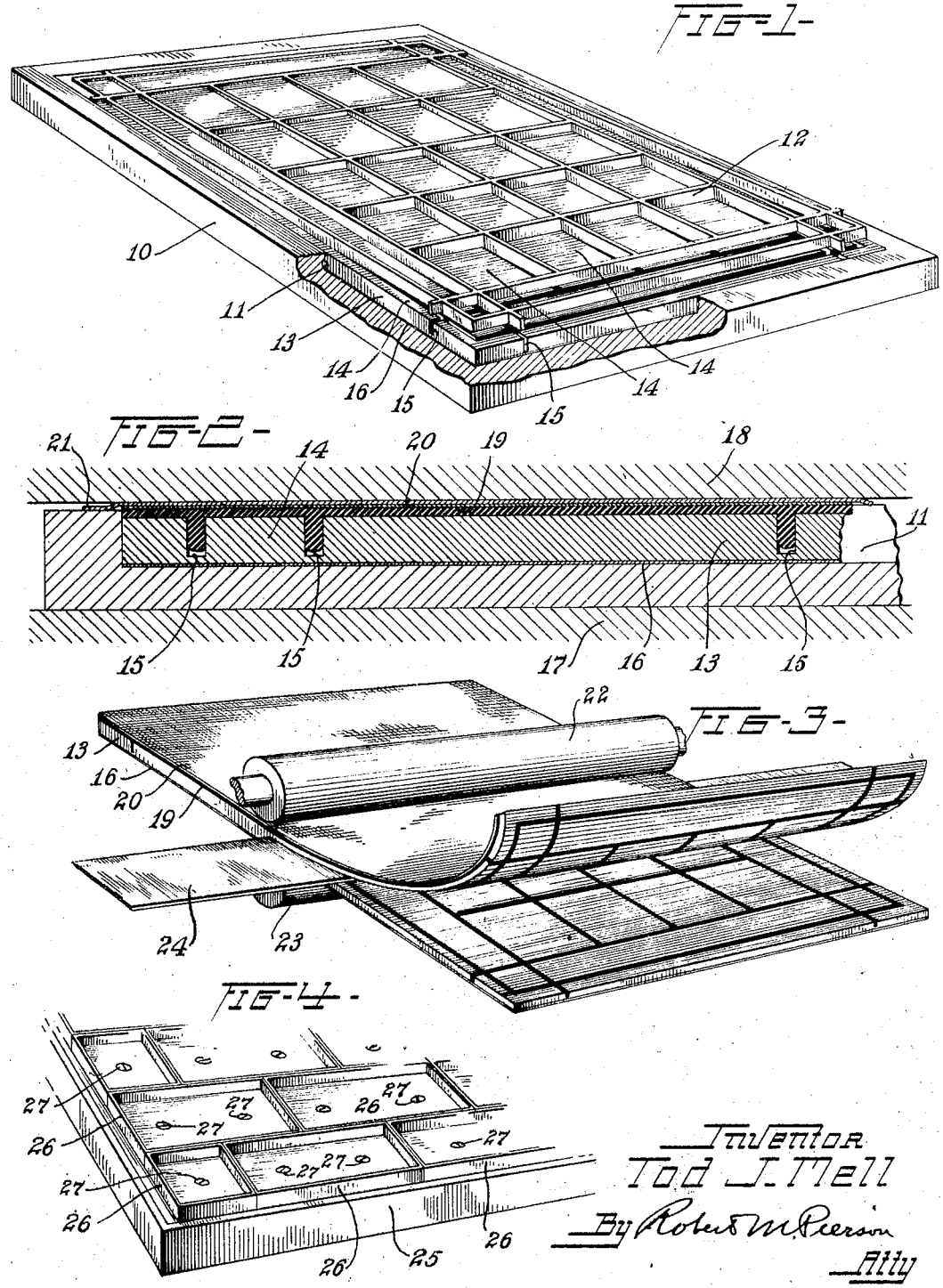
Inventor
Tod J. Mell
By Robert M. Pierson
Atty Patented July 5, 1927.

1,634,955

UNITED STATES PATENT OFFICE.

TOD J. MELL, OF AKRON, OHIO, ASSIGNOR TO THE B. F. GOODRICH COMPANY, OF NEW YORK, N. Y., A CORPORATION OF NEW YORK.

METHOD OF MAKING PATTERNED RUBBER SHEETING.

Application filed November 24, 1924. Serial No. 751,873.

This invention relates to the manufacture of rubber sheeting having a colored pattern or design, and is of especial value in the production of floor covering material or the like, being in some of its aspects an improvement upon that of my United States Patent No. 1,588,797, granted June 15, 1926. It has for its chief object the provision of improved procedure and apparatus whereby sheets of which the designs comprise narrow inlaid or interposed elements may be conveniently and economically made. A further object is to provide an improved mold having elements adapted to be readily substituted or rearranged to produce sheets having different patterns or designs.

I am aware that in the production of linoleum of tesselated pattern and in the tile industry, for example, it has been proposed to produce a patterned assembly by arranging tesserae in spaced relation, or forming a mass of material with raised figures thereon, and filling the intervening spaces with appropriate material by sprinkling it in granular form or flowing it in plastic form, and consolidating the mass, to obtain a single-thickness product, but so far as I am aware such procedure heretofore has never been employed, either by itself or in combination with other features of my invention, in the production of soft rubber sheets. It is of course desirable in producing patterned rubber sheets that the pattern be defined or delineated by accurate lines of demarkation between the elements of different colors, and in my copending application above identified I have accomplished this result by separately forming the interfitting elements; as by molding both or all of them prior to their presentation to each other.

Although rubber is not well adapted to be used in granular form as proposed with reference to linoleum in the procedure above described, or to be accurately filled into interstices between soft rubber elements by propelling a mass of it ahead of a scraper, as has been proposed for filling a cement matrix with tiling cement, I now find that the desired clearness of outline or delineation of the design in a soft rubber sheet may be obtained by employing a rubber matrix, preferably partially vulcanized, with raised elements having their upper faces substantially flush with each other and separated by open interstices, and flowing unvulcanized stock of another color into the interstices, preferably by applying to the said upper faces of the elements an unvulcanized rubber sheet of approximately uniform thickness and pressing it thereon uniformly throughout an extended area, so that pressure of the unvulcanized stock against the raised elements of the matrix is chiefly normal thereto and substantially uniform throughout, in order that the flow of the unvulcanized rubber into the interstices shall not so distort the said elements as to destroy the accuracy of the design.

I also find that by cutting the resulting mass through lines of color division therein, in a plane passing through the above mentioned raised elements of the matrix, especially accurate and definite color demarkation may be obtained.

The rubber composition which is to represent the greater area in the design is preferably used for the matrix, in order that the raised elements thereof may be of sufficient extent to resist distortion as the other rubber composition is pressed into the interstices.

My preferred procedure and apparatus are illustrated in the accompanying drawings, of which:

Fig. 1 is a perspective view, with a part broken away, of mold apparatus embodying and adapted to carry out my invention in its preferred form, at an early stage of the process, and a rubber matrix therein.

Fig. 2 is a fragmentary section of preferred molding apparatus and the work therein at a later stage.

Fig. 3 is a perspective view of a piece of the work produced in accordance with my invention, in the process of being split by preferred apparatus there shown.

Fig. 4 is a fragmentary, perspective view of a mold including preferred means, adapted to be readily substituted or rearranged, for producing matrices of different designs.

The apparatus shown in Fig. 1 of the accompanying drawings comprises a mold 10 formed with a mold cavity 11, a grid 12 adapted to be pressed into a charge of stock in said mold and, with the mold and permissibly with a suitable cover plate therefor, to form the matrix, 13, with raised elements 14, 14, separated by relatively narrow grooves or interstices 15, 15. The grid is preferably so formed, as shown, that the interstices all communicate with the edge faces of the matrix, to avoid entrapping of air as plastic stock is subsequently caused to flow uniformly thereinto from a superposed sheet.

The first part of the process comprises molding the matrix 13 in apparatus such as is shown in Fig. 1, a reinforcement or backing sheet of rubberized burlap 16 preferably being placed in the bottom of the mold and the mold preferably being heated and pressed between press platens such as those shown at 17, 18 in Fig. 2 so as to partially vulcanize the rubber.

The press is then opened, the grating 12 is removed, the upper face of the matrix, including the interior faces of the grooves 15, is coated with rubber cement, a sheet of unvulcanized rubber 19 of a different color or composition from that of the matrix 13 is laid over the upper face of the matrix and pressed thereon by closing of the press, and the mold and its contents are further heated so that the rubber of the sheet 19 flows into and fills the interstices 15 and the composite mass of rubber is unified by vulcanization, although preferably not completely vulcanized. As the interstices are thus filled air is vented therefrom at the edge faces of the matrix 13. In this part of the process a rubberized burlap reinforcement or backing 20 preferably is laid upon and vulcanized to the outer face of the sheet 19, and a piece of canvas 21 preferably is interposed between the burlap and the upper press platen to prevent adhesion of the two. The rubber sheet 19 preferably is relatively thin, so that, while it serves to provide material for filling the interstices and to provide an integral connection between the masses of material filling the same, it will be sufficiently thin that a relatively thin slice may be taken from that side of the composite mass by a cut so directed through the raised portions of the matrix as to provide the desired surface design. The sheet 19 also is preferably of a comparatively quick vulcanizing compound, so that in the final product it will be vulcanized to approximately the same degree as the matrix.

When the matrix 13 and the filler sheet 19 have been united as described, the composite mass is removed from the mold 10 and sliced, as shown in Fig. 3, into two or more sheets by cuts directed through the raised elements 14 of the matrix, so that each sheet has upon its cut face a design corresponding to the form of the grating 12. The burlap backing members 16 and 20, when employed, facilitate the accurate slicing of the mass by assisting in restraining the rubber.

The preferred apparatus for the slicing operation comprises a pair of guiding or presser rolls 22, 23, preferably driven, to feed the rubber mass between them, and a band knife 24 adapted to slice the rubber as it emerges from the nip of the rolls, as described and claimed in my above-identified copending application, such rolls being adapted so to restain the rubber at the cutting edge of the knife as to produce an accurate cut and yet to release it as it passes from said cutting edge so as to avoid binding of the deformable and resilient rubber against the faces of the knife, one of the cut sheets preferably being thin, so that, by reason of its flexibility, it will press but lightly against the knife by spring action and thus avoid gripping of the knife.

After the mass has thus been split or sliced into individual sheets, the cut surface of each sheet preferably is smoothed by further vulcanizing the sheet with said face in contact with a smooth-surfaced pressing member. The employment of the fabric backing member, secured to the rubber mass before the latter is sliced, has the advantage, in connection with the smoothing operation, that it permits the handling of the sliced sheet, as in further vulcanization thereof, without such distortion of the sheet as would destroy the accuracy of the design in the finished product.

The preferred type of mold, shown in Fig. 4, for producing successive sheets having different designs, comprises a mold section 25 having shallow cups or die members 26, 26 secured to its inner face by screws 27, 27 mounted in apertures in their bottoms, the side walls of the assembly of cups forming a design which may be modified or varied by changing the positions of the cups or substituting cups of different form. While the die members here shown are in the form of cups having substantially closed bottoms and are formed and arranged so that their side walls abut each other throughout, I do not wholly limit my claims to these features, although the closed bottoms are of advantage in covering screw holes in the mold section which are not at the time occupied by screws. This type of mold may be used for producing a matrix of the substantial characteristics of the matrix 13 by pressing onto the assembly of cups a sheet of stock of sufficient thickness to fill the cups and preferably to provide a continuous layer of stock overlying the walls of the cups and integrally connecting the masses of rubber pressed into the cups. A rubberized burlap backing such as that shown at 16 in Fig. 1 may be applied to the outer face of said layer and vulcanized thereto concurrently with the forming of the matrix. When the matrix is thus formed it is removed from the mold, inserted, with the raised elements of its design exposed, in a suitable mold, and thereafter proceeded with as above described with relation to the matrix 13.

My invention is susceptible of modification within its scope, and I do not wholly limit my claims to the exact procedure or apparatus described.

I claim:

1. The method of making patterned rubber sheeting which comprises forming a matrix of soft-rubber composition, filling the interstices of said matrix with a different soft-rubber composition by flowing it thereinto by pressure, and slicing the resulting structure into a plurality of sheets by cutting it throughout an extended plane passing through the two compositions, the said compositions being subjected to vulcanization before the slicing operation.

2. The method of making patterned rubber sheets which comprises forming a matrix of soft-rubber composition, partially vulcanizing the same, filling the interstices of said matrix with a different soft-rubber composition by flowing it thereinto by pressure, and slicing the resulting structure into a plurality of sheets by cutting it through the two compositions throughout an extended area such as to provide a serviceable sheeting unit.

3. The method of making patterned rubber sheeting which comprises forming a matrix of soft-rubber composition, filling the interstices of said matrix with a different soft-rubber composition by flowing it thereinto by pressure, and slicing the resulting structure into a plurality of sheets by cutting it throughout an extended plane passing through the two compositions, the said method including a vulcanizing step by which the two compositions are united.

4. The method of making patterned rubber sheets which comprises forming a matrix of soft-rubber composition, partially vulcanizing the same, filling the interstices of said matrix with a different soft-rubber composition, and slicing the resulting structure into a plurality of sheets by cutting it through the two compositions throughout an extended area such as to provide a serviceable sheeting unit, the said method including a vulcanizing step by which the two compositions are united.

5. The method of making patterned rubber sheeting which comprises forming of a soft-rubber composition a matrix having relatively extensive raised elements of which the outer faces are substantially flush with each other, said raised elements being separated by relatively narrow interstices, placing a sheet of another, unvulcanized rubber composition upon the said faces of the said elements and so pressing it thereon as to cause the said interstices to be filled by flow of stock from the said sheet, and slicing the resulting structure into a plurality of sheets by cutting it through the two compositions throughout an extended area such as to provide a serviceable sheeting unit.

6. The method of making patterned rubber sheeting which comprises forming of a soft-rubber composition a matrix having relatively extensive raised elements of which the outer faces are substantially flush with each other, said raised elements being separated by relatively narrow interstices, placing a sheet of another, unvulcanized rubber composition upon the said faces of the said elements and so pressing it thereon as to cause the said interstices to be filled by flow of stock from the said sheet, and slicing the resulting structure into a plurality of sheets by cutting it through the two compositions throughout an extended area such as to provide a serviceable sheeting unit, the said method including a vulcanizing step by which the two compositions are united.

7. The method of making patterned rubber sheeting which comprises forming of a soft-rubber composition a matrix having relatively extensive raised elements of which the outer faces are substantially flush with each other, said raised elements being separated by relatively narrow interstices, partially vulcanizing said matrix, placing a sheet of another, unvulcanized rubber composition upon the said faces of the said elements and so pressing it thereon as to cause the said interstices to be filled by flow of stock from the said sheet, then uniting the two compositions by vulcanization, and thereafter slicing the resulting structure into a plurality of sheets by cutting it through the two compositions throughout an extended area such as to provide a serviceable sheeting unit.

8. A method as defined in claim 4 in which a relatively quick-vulcanizing compound is used for filling the matrix.

9. A method as defined in claim 3 in which a backing element is joined to one of the compositions by vulcanization before the slicing operation.

10. A method as defined in claim 4 in which the matrix is coated with rubber cement before being filled with the second composition.

In witness whereof I have hereunto set my hand this 13th day of November, 1924.

TOD J. MELL.